United States Patent Office 2,716,195
Patented Aug. 23, 1955

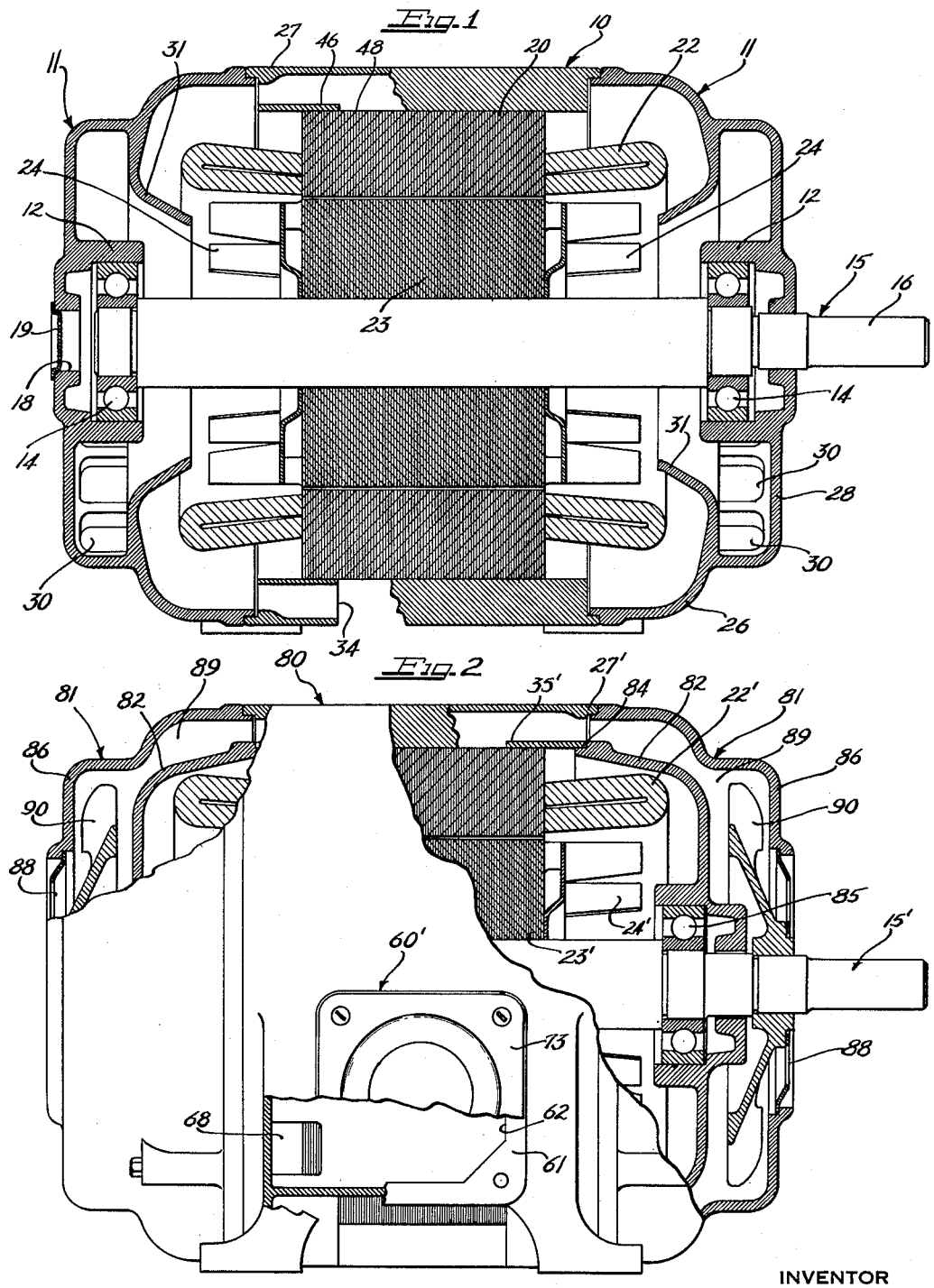

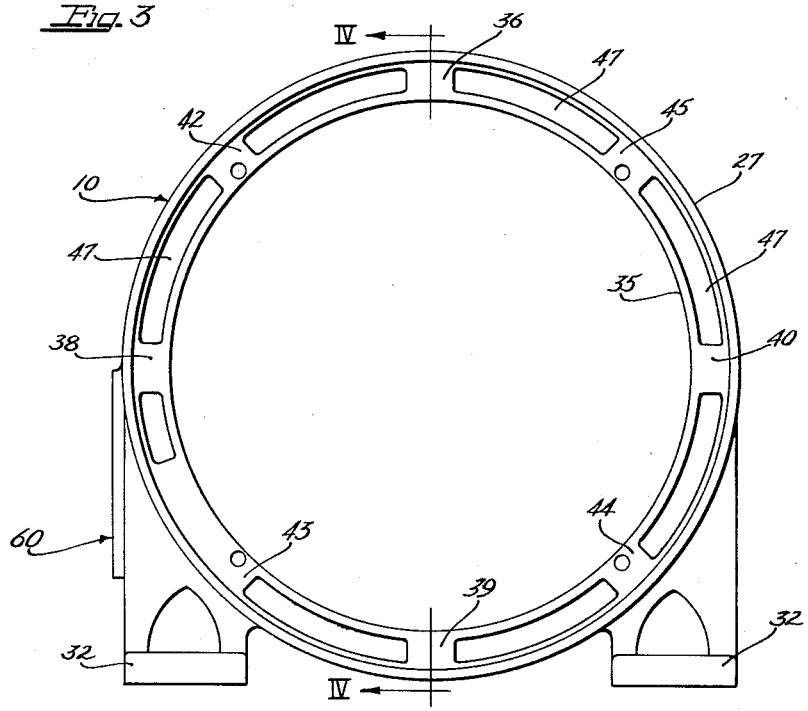
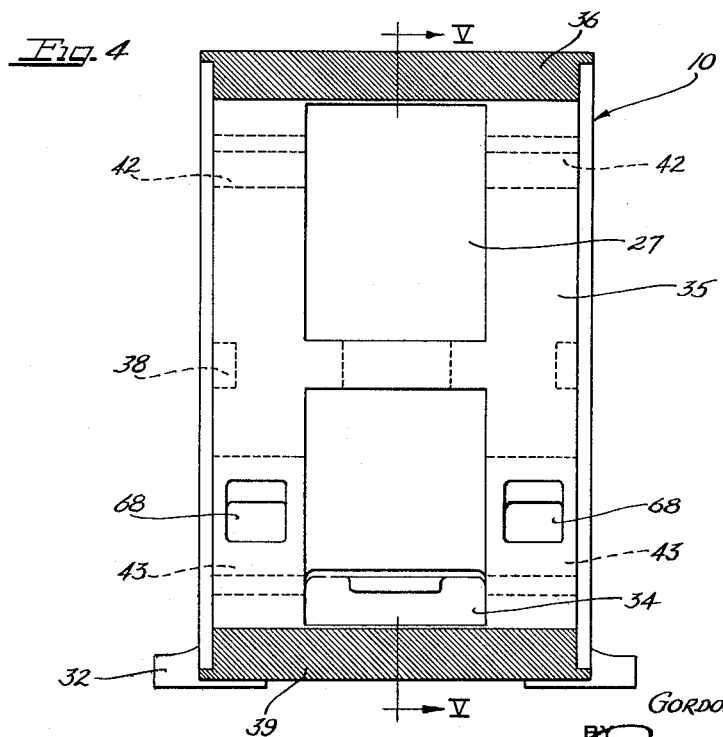

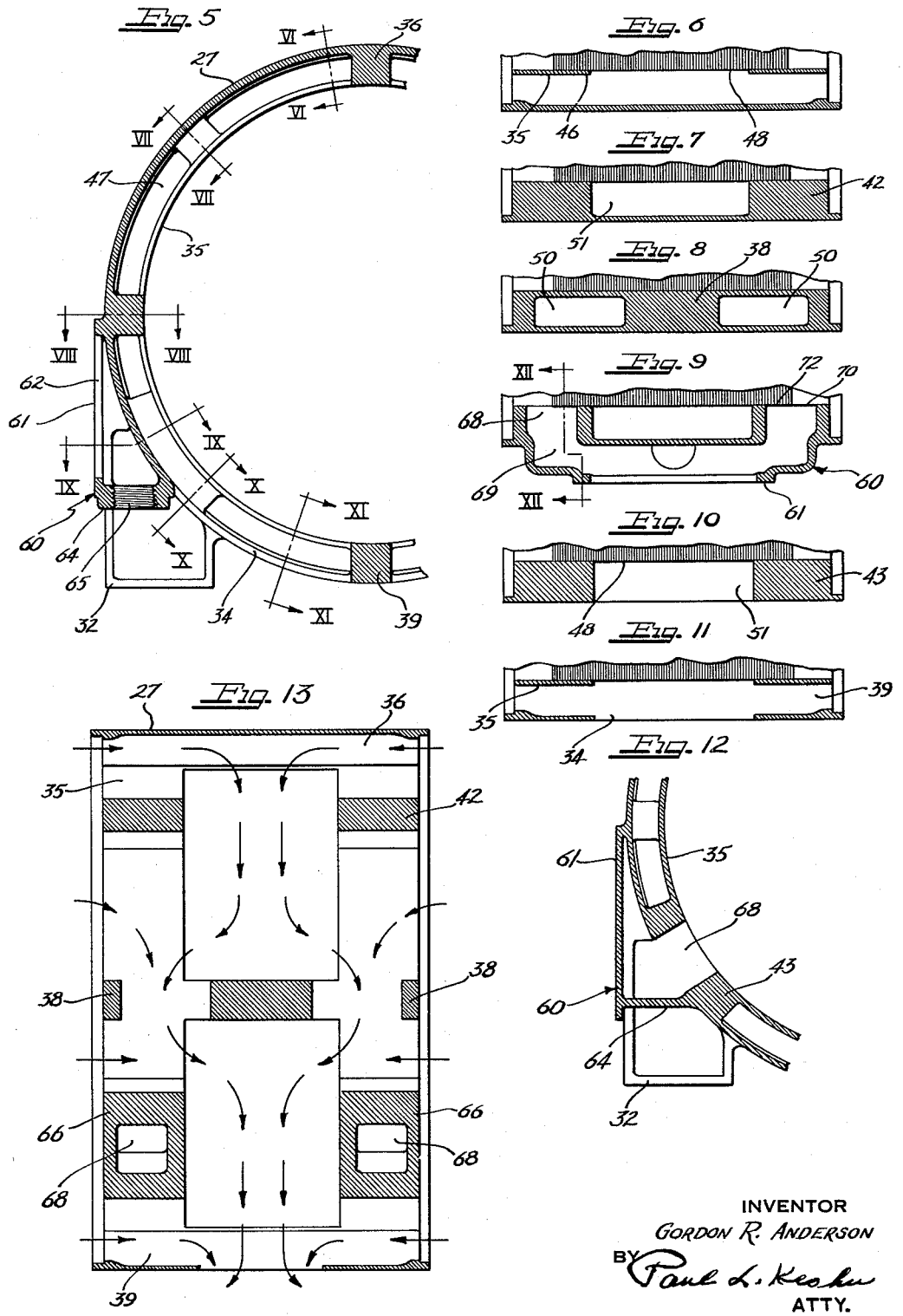

2,716,195

VENTILATION OF ELECTRIC MACHINES

Gordon R. Anderson, Freeport, Ill., assignor to Fairbanks, Morse & Co., Chicago, Ill., a corporation of Illinois Application December 26, 1952, Serial No. 328,117

8 Claims. (Cl. 310—59)

This invention relates to improvements in electric machines, and more particularly to novel and effective provisions for motor cooling and ventilation applicable to electric motors of totally enclosed and substantially enclosed drip and splash proof types.

An object of the invention is to provide a frame assembly for such motors, characterized by improved construction for facilitating motor ventilation and cooling in such effective and efficient degree as to permit appreciable increase of motor power ratings for given frame sizes.

Another object is to provide an enclosed motor having a frame assembly of improved construction as aforesaid, wherein the improved frame embodies a separate space for receiving the motor winding leads, and provides for passage cooling air through such space.

Other objects and advantages will be readily apparent from the following description of embodiments of the present invention as such are illustrated in the accompanying drawings, wherein:

Fig. 1 is a view in longitudinal section, of an electric motor of drip and spash proof type embodying the present improvements.

Fig. 2 is a view shown partly in section, of a totally enclosed type of electric motor to which the present improvements are applied.

Fig. 3 is an end view of the stator supporting frame member constructed according to the present invention.

Fig. 4 is a longitudinal sectional elevation of the frame member as taken along line IV—IV in Fig. 3.

Fig. 5 is a fragmentary transverse section of the frame member, as viewed from line V—V in Fig. 4.

Figs. 6 through 11 are sectional detail views of the frame member as taken respectively, along the sectional lines VI—VI through XI—XI in Fig. 5.

Fig. 12 is a fragmentary sectional detail of a portion of the frame, as viewed along line XII—XII in Fig. 9.

Fig. 13 is a longitudinal sectional view of the frame member, illustrating the cooling air flow paths in the frame.

Referring first to Fig. 1, the motor there shown in longitudinal section is of a substantially enclosed, drip and splash proof type. As illustrated, this motor includes an open end stator supporting frame member 10 of double-wall construction in accordance with the present invention and as will appear more fully hereinafter. The end closure members 11 for the open ends of the frame 10, preferably are of identical construction providing internal bearing bosses 12 receiving bearings 14 for supporting the motor shaft 15. The shaft extends at 16 through one of the members 11, while the shaft opening 18 of the opposite member 11 is closed by a suitable closure element 19. Carried in frame 10 is the motor stator comprising a stator core 20 preferably of laminated construction and slotted to receive the stator winding 22. Cooperating with the stator member is a rotor 23 suitably mounted on shaft 15, the rotor preferably being of squirrel-cage type and carrying at each end thereof an air moving device or fan 24.

Each end closure member 11 which is bolted or otherwise suitably connected to frame 10, provides a wall 26 joining with the outer wall 27 of frame 10, and having a wall extension 28 supporting the interior bearing boss 12 and formed to provide a suitable number of air inlet openings 30 in the region of wall 28 near the lower or mounting end of the motor. Extending within each end closure member 11 is a baffle wall 31 which directs air entering through the inlet openings 30, to the fan 24, and directs air in discharge from the fan, over the stator windings and to the double-walled frame 10 for passage therein in a manner presently to appear.

With reference now in particular to Figs. 3 through 12, the stator supporting frame member 10 is here illustrated as being of generally ring form and comprises a circumferentially continuous outer wall 27 having paired motor mounting extensions 32 at opposite sides of the frame. The outer wall 27 has an air discharge opening 34 (Figs. 1, 5, and 11) medially of the wall over the portion thereof extending between the opposite paired extensions 32. The frame member further includes an inner wall comprised of relatively axially spaced wall elements 35 each extending inwardly from one open end of the frame and being circumferentially continuous as appears in Fig. 3.

Spacing the inner wall elements radially inward of the outer frame wall 27 are a plurality of spacing elements of rib-like form, preferably equally angularly spaced about the frame and each directed axially of the frame. The alternate ribs 36, 38, 39, and 40 span the inner wall elements 35 between the open ends of the frame, while the intervening ribs do not span the inner wall elements but are provided by two sets of axially aligned ribs 42, 43, 44, and 45, one set for each inner wall element. The inner wall elements afford a mounting seat for the stator member 20, the latter in assembly to the motor spanning the wall elements and having its peripheral end surface portions 46 in firm seating engagement with the inner wall elements. Thus it will appear that in the mounted relation of the stator 20 in frame 10, the central peripheral surface of the stator is exposed in the medial region of frame 10 between the spaced apart inner wall elements 35.

The several spacing ribs cooperate with the inner and outer walls of the frame 10 to provide a plurality of axially extending air passages 47 opening at the ends of the frame and to the medial region of the frame between the outer wall 27 and the peripheral stator surface 48 exposed between the inner wall elements 35. Moreover, the rib element 36 most remote from the air discharge opening 34, is imperforate or devoid of any openings therethrough, while each rib 38 and 40 is formed to provide axially spaced air openings 50 (Fig. 8) transversely through the rib. The bottom rib 39 which spans the air discharge opening 34, may be imperforate as shown in Fig. 4. The sets of ribs 42, 43, 44, and 45 individual to the inner wall elements and hence axially spaced apart, define air openings 51 (Fig. 7) directly over the central exposed surface of the stator 20, there being one such air opening between each corresponding pair of these ribs.

In the operation of the motor of Fig. 1 embodying the improved frame structure as now described, the fans 24 induce positive air flow inwardly of the motor through inlet ports 30 at each end of the motor, to and in heat-absorbing relation about the stator windings 22, thence to and through the several frame passages 47. As indicated in Fig. 13, the air streams entering the passages 47 from the opposite ends of frame 10, in large part unite in the medial region of the frame over the exposed surface of the stator 20, for flow in the circumferential direction over said exposed stator surface. The imperforate rib 36 remote from the air discharge opening 34, serves to divide the air flow in the circumferential direction, into two paths extending oppositely and downwardly over the stator at the sides of the frame toward the bottom discharge opening 34. Each such circumferential path of air flow is somewhat tortuous as appears in Fig. 13, wherein the air streams in uniting in the medial frame region and flowing in heat-absorbing contact with the stator, pass through the rib openings 50 and 51 and finally to discharge through the discharge opening 34. Accordingly, cooling air is thereby directed into intimate heat-absorbing contact with the surface of the inner wall elements 35 and most importantly, with a relatively large exposed surface area of the core structure of stator 20, in divided circumferential flow thereover, while the discharge of the air is effected advantageously at the bottom of the frame between the mounting extensions 32.

As shown by Figs. 3 to 5, 9, 10, 12, and 13, the presently improved motor frame structure 10 is formed to provide a hollow boss 60 externally of the frame wall 27 and in a central area thereof between the frame mounting extensions 32 at one side of the frame. The forward or front wall 61 of the boss has a relatively large opening 62 giving access to the boss interior, while the bottom wall 64 of the boss is provided with an opening 65 providing further access to the boss interior. Wall 64 is preferable normal or at a right angle to the forward wall 61, and the opening 65 preferably is threaded as shown for receiving selectively, either a plug closure element (not shown) or the threaded end of a power conductor conduit (also not shown). The hollow boss is provided for receiving the motor winding leads (not shown), and to this end communication is established between the boss interior and the interior of the frame in a manner now to be described.

As shown particularly by Figs. 9, 10, 12, and 13, the spacer ribs 43 individual to the frame inner wall elements 35 are extended in the circumferential direction between the inner and outer frame wall, as at 66. Extending through the outer frame wall 27 and through each rib extension 66 and the associated inner wall element 35 is a passage 68 communicating at one end 69 with the boss interior at one side thereof. The opposite end of the passage opens at 70 around an overlying portion 72 of the stator 20, to the interior of the frame.

The winding leads (not shown) of stator winding 22 are extended through one or the other or both of the passages 68 to the interior of the boss 60, wherein they are connected to terminal ends of power supply conductors (not shown). In effecting power conductor connection to the motor leads, this may be accomplished by extending the power conductors through the bottom opening 65 with the power conduit threaded in this opening. In this event, the front wall opening 62 normally will be closed by a suitable cover plate, such as the cover plate 73 shown in Fig. 2. By making the power connection in this way, the power conduit may be confined to the region immediately below the motor frame and between the mounting extensions 32 at the side of boss 60. If desired, however, the opening 65 may be plugged and power connection to the motor leads made through the boss opening 62. In this event, the cover plate 73 may be replaced by a suitable conduit box (not shown) or similar device for leading the power conductor terminals into the boss. Thus the hollow boss 60 affords selective power connection either from beneath the motor, or at one side thereof.

A feature of the hollow boss arrangement as above described, is the provision of the opposite passages 68 which in addition to receiving the motor leads therethrough, afford air circulation through the hollow boss. The passages 68 being open at 70 to the interior of the motor frame, receive some of the air flow established by the fans 24, for generally cross-flow through the hollow boss.

In the totally enclosed motor embodiment of Fig. 2, the stator supporting frame structure 80 preferably is identical with the stator structure 10 now fully described, while the opposite end closure members 81 are of double-wall construction as shown. These end closures afford total enclosure of the motor stator and rotor parts, by the inner walls 82. Each inner wall 82 extends to marginal, air sealing engagement with the end margin 84 of the adjacent inner frame wall 35'. Preferably, the inner walls 82 support bearings 85 operatively supporting the motor shaft 15'. The outer wall 86 of each end closure, extends to air sealing engagement with the outer frame wall 27', and is provided with a suitable air admission opening 88 preferably coaxial of the motor shaft. In the space 89 between the walls 82 and 86 of each end closure, is disposed a suitable shaft-driven fan 90 for establishing positive air flow inwardly through the air admission opening 88, to and through the stator supporting frame 80 in a course of air flow therethrough as hereinbefore described in connection with the frame 10 of the motor illustrated by Fig. 1.

The fans 24' on the motor rotor 23', establish circulation of air within the enclosed motor in cooling contact with the stator windings 22', air circulation also occurring from one end of the motor to the other through the hollow boss 60', as in the manner described in respect to the hollow boss 60 and passages 68 shown in Fig. 9.

It will appear now that the present invention affords an improved ventilating and cooling means for motors of the type indicated, wherein a positive flow of cooling air is established from each end of the motor, to pass generally axially in the stator supporting frame structure with the opposite axial air streams uniting in the medial region of the frame and dividing for flow in opposite circumferential paths over exposed portions of the stator core member to discharge beneath the motor. Advantageously also, the separate stator lead spaced afforded by the hollow boss 60, is ventilated by air flow therethrough in the manner described. It is to be noted here as a further important feature of the present invention, that the stator supporting frame 10 (and the identical frame 80 of the totally enclosed motor of Fig. 2) is constructed as a one-piece or unitary structure, including the inner and outer walls, spacer ribs, mounting extensions and the hollow boss. Formed as a single casting, the structure affords a rigid frame in which the air passage surfaces of the inner and outer walls and the several spacing ribs are retained in rough cast condition, thereby offering a greater total surface area for heat transfer to the cooling air. The result then, is the provision of an improved frame structure adapted for conducting and distributing forced flow air in heat-absorbing relation to the frame parts and the stator supported thereby, to produce motor cooling in such effective degree as to permit appreciable increase of motor power rating for a given frame size.

Having now described and illustrated several embodiments of the present invention, what is claimed is:

1. In a ventilated electric machine, an open end frame member providing a circumferentially continuous outer wall and frame mounting projections at opposite sides of the frame member, said wall having an air discharge opening in a medial portion thereof between said opposite mounting projections, a hollow boss formed externally on said outer wall and extending adjacently to and between the mounting projections at one side of the frame member, circumferentially continuous inner wall elements relatively spaced apart axially of the frame member, spacer elements mounting said inner wall elements on the outer wall in positions radially inward of the outer wall, a stator member spanning said wall elements and having its peripheral end surfaces seating on the wall elements, said spacer elements cooperating with said outer wall, the inner wall elements and stator member to define air passages extending inwardly from the open ends of the frame to the medial frame region between the outer wall and the circumferential portion of the stator member exposed between said wall elements, said spacer elements further being adapted for establishing in the medial frame region, air flow paths extending oppositely from a frame point remote from said discharge opening, generally circumferentially over the exposed portion of the stator member to the discharge opening, said frame member having passage means communicating with the interior of said hollow boss and extending through said outer wall and opening through at least one of said inner wall elements, end closure means for the open ends of the frame member each having an air inlet opening, and rotor means supported by said end closure means for cooperation with said stator member, said rotor means including air moving for causing air flow from said inlet openings to and through said air passages and along said flow paths to discharge through said discharge opening.

2. A stator supporting frame for a ventilated electric machine, comprising an open end frame member providing a circumferentially continuous outer wall and paired mounting extensions at opposite sides of the frame member, the outer wall having an air discharge opening extending between the opposite mounting extensions, circumferentially continuous inner wall element relatively spaced apart axially in the outer wall, rib elements spanning said wall elements and securing the latter to said outer wall in positions radially inward of the outer wall, one rib element remote from said discharge opening being imperforate and other rib elements having openings transversely therethrough, a hollow boss externally on said outer wall and extending between the pair of mounting extensions at one side of the frame member, an outer wall of said hollow boss having an opening therein, and said frame member providing passage means communicating with the interior of the hollow boss and extending through said outer wall to and opening through at least one of said inner wall elements.

3. A stator supporting frame for a ventilated electric machine, comprising an open end frame member providing a circumferentially continuous outer wall and paired mounting extensions at opposite sides of the frame member, the outer wall having an air discharge opening medially thereof between the opposite mounting extensions, circumferentially continuous inner wall elements relatively spaced apart axially in the outer wall, rib elements spanning said wall elements and securing the latter to said outer wall in positions radially inward of the outer wall, certain of said ribs having openings transversely therethrough, a hollow boss externally on said outer wall and extending between the pair of mounting extensions at one side of the frame member, adjacent outer walls of said boss each having an access opening therein, and said frame member providing passage means communicating with the interior of said hollow boss and extending through said outer wall to and opening through one of said inner wall elements.

4. A stator supporting frame for a ventilated electric machine, comprising an open end frame member providing a circumferentially continuous outer wall and paired mounting extensions at opposite sides of the frame member, circumferentially continuous inner wall elements relatively spaced apart axially in the outer wall and supported therefrom in positions spaced radially inward of the outer wall, a hollow boss externally on said outer wall extending between the pair of mounting extensions at one side of the frame member, said boss providing adjacent outer wall portions one extending substantially normal to the other and each having an access opening therethrough, and said frame member being formed to provide passages each communicating with the interior of said hollow boss and extending through said outer wall to and opening through one of said inner wall elements.

5. A stator supporting frame for a ventilated electric machine, comprising an integral open end frame member formed to provide circumferentially continuous outer and inner walls relatively spaced apart, said inner wall being constituted by axially spaced apart wall elements each extending inwardly from one open end of the frame member, said frame member including a hollow boss externally on the outer wall and having adjacent outer wall portions one extending at an angle to the other, each such wall portion having an access opening therein, and said frame member being further formed to provide separate passages in communication with the interior of the boss and each extending through said outer wall to and opening through one of said inner wall elements.

6. A stator supporting frame for a ventilated electric machine including a stator member, comprising an integral open end frame member formed to provide circumferentially continuous outer and inner walls, said inner wall being constituted by axially spaced apart wall elements each extending inwardly from one open end of the frame member, the inner wall elements serving to support the stator member with the latter having its circumferential outer surface exposed in major portion between the spaced apart wall elements, means spacing the wall elements inwardly of the frame from the outer wall and defining ventilating air passages between the inner and outer walls extending to communication with the said exposed outer surface of the stator member, said frame member including a hollow boss externally on the outer wall and having adjacent outer wall portions one extending at an angle to the other, each such wall portion having an access opening therein, and said frame member being further formed to provide separate passages in communication with the interior of the boss and each extending through said outer wall to and opening through one of said inner wall elements.

7. A stator supporting frame for a ventilated electric machine, having a stator including an annular stator core, comprising a unitary frame member open at each end and providing a circumferentially continuous outer wall and paired mounting members at opposite sides of the frame, the outer wall having an air discharge opening in the portion thereof between said paired mounting members, circumferentially continuous inner wall elements relatively spaced apart axially in the outer wall, said inner wall elements engaging the circumferential margins of the stator core in stator mounting with the peripheral surface of the core between said core margins, exposed between the inner opposed margins of said inner wall elements, and rib elements securing said inner walls to said outer wall in positions spaced radially inward of the latter, one rib element remote from said discharge opening of the outer wall, spanning said inner wall elements and being imperforate, another rib at each side of the frame, spanning said inner wall elements and having axially spaced air flow openings transversely therethrough, other rib elements at each side of the frame between said one and another rib elements, being individual to the inner wall elements and disposed in axial alignment to form an air flow opening therebetween, and still other rib elements at each side of the frame between said another rib element and said air discharge opening in the frame outer wall, being individual to the inner wall elements and being axially opposed to form an air flow opening therebetween.

8. In a ventilated electric machine, a frame assembly providing a central frame member and opposite end closure means each having an air inlet opening, said frame member providing a circumferentially continuous outer wall having an air discharge opening, and inner annular wall elements relatively spaced apart axially of the frame member, a plurality of rib elements directed axially of the frame between said outer wall and inner wall elements, mounting the latter in positions radially inward of the outer wall, one of said rib elements remote from said outer wall air discharge opening spanning the wall elements and being imperforate, others of said rib elements provided in relatively angularly spaced relation at each side of the frame, being formed and arranged to provide air flow openings medially in the frame and transverse to the direction of the rib elements and other air flow openings transverse to the direction of the rib elements and laterally off-set relative to the first said air openings, a stator member spanning said inner wall elements with its peripheral end surfaces seating against the wall elements, said rib elements defining with said outer wall, the inner wall elements and the stator member, a plurality of air passages extending inwardly from the ends of the frame member to the medial frame region between the outer wall and the peripheral surface portion of the stator member exposed between said wall elements, said one imperforate rib element separating said medial frame region into opposite air flow paths each extending in the circumferential direction over said exposed peripheral surface of the stator member and through said air flow openings, to said frame discharge opening, each such flow path being divided in the region of its extent containing the said laterally off-set air flow openings, and rotor means supported by said end closure means for operative cooperation with said stator member, said rotor means including means for effecting forced air flow inwardly of the frame assembly through said air inlet openings of the end closure means, to and through said air passages and along said air flow paths to discharge through said discharge opening.

References Cited in the file of this patent

UNITED STATES PATENTS

| | | |
|---|---|---|
| 2,114,907 | Oesterlein | Apr. 19, 1938 |
| 2,353,235 | Hamilton | July 11, 1944 |

FOREIGN PATENTS

| | | |
|---|---|---|
| 351,957 | Great Britain | June 26, 1931 |